2,943,941
STABILIZED MALT BEVERAGES

Philip P. Gray, New York, Irwin M. Stone, Eastchester, and John E. Wylie, Manhasset, N.Y., assignors to Baxter Laboratories, Inc., New York, N.Y., a corporation of New York No Drawing. Filed Jan. 29, 1958, Ser. No. 711,781

4 Claims. (Cl. 99—48)

This invention relates to an improved process for stabilizing and chillproofing malt beverages and to the improved malt beverages thereby produced.

Malt beverages such as beers and ales are widely distributed in packaged form, that is, in glass bottles and tin cans. This packaging and wide distribution of the beverage makes it necessary to have a beverage able to withstand the adverse conditions of both high and low temperatures, vibration, exposure to light, traces of certain metals and other factors that affect its stability and shelf-life. The beverage must reach the consumer in a brilliant condition with unchanged flavor and the ability to remain clear when subjected to chilling before consumption. The ability of a beverage to remain clear when subjected to low temperatures is termed its "chillproofness" by the industry and the length of time the beer remains satisfactorily chillproof following packaging, referred to as its "shelf-life," is an important attribute of the product.

It is commonly accepted practice in the industry to treat the beverage after fermentation with certain proteolytic enzymes, the so-called "chillproofing enzymes," followed by filtering, packaging, and pasteurizing the beverage. Some of the activity of these enzymes survives pasteurization and the presence of these enzymes in the beverage in active form is desirable for maximum shelf-life.

Certain conditions such as air contained in the packaged beverage, high package storage temperatures, vibration, and traces of certain metals adversely affect the stability of the beverage causing the formation of hazes and sediments, especially when the beverage is chilled. These factors which adversely affect the shelf-life of the beverage also tend to inactivate the surviving chillproof enzymes.

We have found that polyvinylpyrrolidone (PVP), copolymers of vinylpyrrolidone with vinyl esters and saponification products of such copolymers may be used to stabilize and chillproof beer as herein described and that they are especially effective in combination with proteolytic enzymes. One of the main advantages of beers treated with a sufficient amount of these polymers is their unusual resistance to any changes in chillproofness despite the influence of oxidative and other conditions as well as their continued chillproofness and stability at high storage temperatures.

We have found that beers produced as herein described are normal in all respects and remain clear and brilliant on icing following storage either at high temperatures or in the presence of high air contents in the package. These polymers and copolymers when used as herein described do not precipitate to form a haze or turbidity when the beer is subjected to cold temperatures; neither do they adversely alter color, taste or foam retention.

Polyvinylpyrrolidone has been suggested as a precipitating agent for clarifying malt beverages in a patent issued to McFarlane, No. 2,688,550. In this process, limited amounts of polyvinylpyrrolidone are added to the beer to combine with and form a precipitate with the tannin-like bodies that are normally contained in the beverage. This precipitate is removed by filtration or other means to improve stability.

We have found that polyvinylpyrrolidones of an average molecular weight in excess of about 30,000 are required to induce the formation of this precipitate in the beverage in this process. Faster precipitation and better coagulation of the precipitate aiding subsequent filtration is obtained if polymers with average molecular weights of 40,000 or higher are employed. The average molecular weight of the polymer is related to its viscosity in aqueous solution and a K value (Fikentscher) may be calculated from the viscosity, which is used in the industry to denote the degree of polymerization. A K value of 30 is approximately equivalent to an average molecular weight of 40,000.

The amount of polyvinylpyrrolidone that is recommended to be employed in this prior process is of the order of equal parts by weight to the tannin bodies contained in the beverage. In any case the amount of PVP required for beer is stated to be within the range of 0.5 to 2 pounds per 100 barrels of beer. Precipitate formation is reported to take place in the beer within an hour or so after the addition.

We have found that the addition of an excess of polyvinylpyrrolidones, their copolymers with vinyl esters or saponification products of such copolymers beyond the range of 2 pounds per 100 barrels not only prevents the formation of a precipitate in the beer but produces a stabilization of the beverage of a greatly superior effect than is obtained by the use of stated smaller amounts of PVP with removal of the precipitate.

The use of these higher proportions of polyvinylpyrrolidones eliminates the necessity for the step of the separation and removal of the precipitate of the polyvinylpyrrolidone-tannin complex.

The stabilization attained by these higher proportions of polymers or copolymers alone is unaffected by the oxidative effects of large amounts of air present in the beer or the head space. The treated beer is also resistant to the effects of storage at high temperatures. These desirable properties are not present in beer processed by the limiting levels of polyvinylpyrrolidone proposed heretofore.

We have further found that vinylpyrrolidone polymers and copolymers may replace a part of the chillproofing enzymes and be used in combination with them without inactivating them and without forming insoluble products. In fact, we have noted that when so used PVP tends to stabilize the enzyme solution. Superior stability is attained by such conjoint use. The enzymatic preparations used may be any of the enzymes or enzymatic preparations disclosed in U.S. Patents Nos. 995,820, 995,824, 995,825, 2,077,447, 2,077,448 and 2,077,449, or any other enzymatic preparations having the same effect.

The mechanism of our process does not involve forming an insoluble complex which must be removed. The action may in part be due to the formation of a soluble complex or to a solubilizing or peptizing action with respect to the components that would otherwise cause haze formation when the beer is chilled.

The polymers or copolymers may be added to the beverage at any stage during processing, preferably after fermentation, and they may be added conveniently to the beer going into storage before the customary final filtration. If chillproofing enzymes are employed, the polymers or copolymers may be added at the same stage or independently of one another.

When the polymeric adjuncts are used in combination with enzymes or other chillproofing agents, the optimum quantities prescribed for each when used alone may be reduced.

The polymers or copolymers may be dissolved in water or beer to form concentrated solutions and then added to the main portion of the beer; or they may be added directly to the beer in process. Mixing into the beer may be accomplished either by pumping into the tanks by usual means from a proportioning pump while the tanks are being filled or by placing the concentrated solution in the bottom of the tanks and allowing the force and current of the incoming beer to accomplish the mixing. After the addition of the polymers to the beer there is no further change in the customary finishing procedure. No additional filtrations or other operations are required as a result of the treatment of this invention.

The polymeric materials suitable for use in this invention include water-soluble polymers of N-vinylpyrrolidone, water-soluble copolymers of N-vinylpyrrolidone with vinyl esters such as vinyl formate, vinyl acetate, and vinyl chloride, and saponification products of such copolymers having an average molecular weight in excess of 30,000.

The polyvinylpyrrolidones and their copolymers may be produced in varying degrees of polymerization, copolymerization or viscosity by the usual polymerization procedures, and grades suitable for use in this invention are available commercially. The type of polyvinylpyrrolidone used as a blood plasma extender is suitable although for this particular use a less highly purified material may be employed. This type is known in the trade as the "non-pharmaceutical" grade to distinguish it from the "pharmaceutical" or blood extender type and has a K value of 30 and an average molecular weight of 40,000.

The copolymers can be prepared by known methods which are not a part of this invention. One method may be cited as an example: 15 liters of vinylpyrrolidone, 5 liters of vinyl acetate, 80 liters of methanol, and 83 grams of azo-bis-isobutyronitrile are heated for 28 hours at 60° C. The resulting vinylacetate copolymer is precipitated by ether. This copolymer may be converted into the corresponding vinyl alcohol copolymer by heating with methanolic KOH. The material may be purified by dialysis.

The quantities of polymers or copolymers used in this invention are dependent upon the degree of stabilization desired in the malt beverage. An amount slightly in excess of 2 pounds of K 30 polyvinylpyrrolidone per 100 barrels of beer will produce a moderate stabilization. Increased stabilization results from larger proportions, as when 4 to 6 pounds of this polymer per 100 barrels of beer are used. These higher quantities produce a beverage of prolonged stability and resistance to heat and oxidation. Amounts in excess of these levels for instance up to 10 or 20 pounds per 100 barrels may be used but normally this is unnecessary and uneconomical. If polymers or copolymers of increased K values, or higher molecular weights are employed then slightly higher amounts over the 2 lb. limit are required to prevent precipitation. The excess amount of polymer required to avoid precipitation, for any particular beer, is related to its molecular weight, for instance if over 2.0 lbs. of K 30 polymer is required for a certain beer, then over 2.5 lbs. of K 60 polymer and over 3.0 lbs. of K 90 polymer may be required to obtain the same effect. The use of polymers or copolymers with K values greatly in excess of 90 having molecular weights over about 350,000 may not be economically feasible or practical because of the large amounts of polymer required to avoid precipitation of the polymer-tannin complex.

Individual polymers or copolymers may be used alone or in any combination. We have found that the action of the polymeric substances and of the chillproofing enzymes are mutually compatible and we have also found that so long as the amount of polymer or copolymer used exceeds about 2 pounds per 100 barrels considerable economy in the use of both enzyme and polymer can be achieved by a combined treatment while stability and shelf-life of a very superior degree is attained. In fact the stability is actually different in kind as well as degree since the treated beer has unusual resistance to the effect resulting from occluded air, oxidation, exposure to high temperatures or other deleterious factors.

Traces of metallic contaminants such as iron and copper existing in beer to the extent of only a fraction of a part per million deleteriously affects its stability and shelf-life. These metals act as oxidation catalysts, accelerating oxidative reactions and shortening the shelf-life. The treatment of the beer with the polyvinylpyrrolidone or the copolymers as outlined herein produces a beer which is unusually stable even in the presence of these catalytically active metals. Thus, the polyvinylpyrrolidone treatment prevents the deleterious effect of the presence of these catalytically active metals.

This application is a continuation-in-part of our application Serial No. 504,689 filed April 28, 1955.

We claim:

1. The process of stabilizing malt beverages normally containing tannin bodies which comprises adding to the fermented malt beverage at a stage in the processing thereof prior to packaging a water soluble polyvinylpyrrolidone of an average molecular weight in excess of about 30,000 in an amount sufficiently in excess of the amount which will precipitate with said tannin bodies to prevent the formation of a precipitate in said beverage and to stabilize the packaged beverage against the formation of haze therein on long standing even in the presence of air.

2. The process as defined in claim 1 wherein a proteolytic enzyme is also added to the beverage.

3. A stabilized malt beverage containing a water soluble polyvinylpyrrolidone of an average molecular weight in excess of about 30,000 in an amount sufficiently in excess of the amount which will precipitate with said tannin bodies to prevent the formation of a precipitate in said beverage and to stabilize the packaged beverage against the formation of haze therein on long standing even in the presence of air.

4. A stabilized malt beverage containing a water soluble polyvinylpyrrolidone of an average molecular weight in excess of about 30,000 in an amount sufficiently in excess of the amount which will precipitate with said tannin bodies to prevent the formation of a precipitate in said beverage and to stabilize the packaged beverage against the formation of haze therein on long standing even in the presence of air and a proteolytic enzyme.

References Cited in the file of this patent

UNITED STATES PATENTS

| 2,688,550 | McFarlene | Sept. 7, 1954 |
| 2,811,449 | Witwer et al. | Oct. 29, 1957 |

OTHER REFERENCES

"Vinyl and Related Polymers," by Schildknecht, pub. 1952 by John Wiley & Sons, Inc., New York, page 676.